(12) United States Patent
Matsubara et al.

(10) Patent No.: US 8,113,376 B2
(45) Date of Patent: Feb. 14, 2012

(54) STATIC ELECTRICITY DISCHARGE TANK CAP

(75) Inventors: Yasunori Matsubara, Wako (JP); Teruyuki Saitoh, Wako (JP); Keita Ito, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 528 days.

(21) Appl. No.: 11/920,439

(22) PCT Filed: Jun. 23, 2006

(86) PCT No.: PCT/JP2006/312610
§ 371 (c)(1),
(2), (4) Date: Nov. 15, 2007

(87) PCT Pub. No.: WO2006/137521
PCT Pub. Date: Dec. 28, 2006

(65) Prior Publication Data
US 2009/0026207 A1    Jan. 29, 2009

(30) Foreign Application Priority Data

Jun. 23, 2005 (JP) ................................ 2005-183597
Sep. 2, 2005 (JP) ................................ 2005-254565

(51) Int. Cl.
*B65D 53/02* (2006.01)

(52) U.S. Cl. .................. 220/304; 220/378; 220/DIG. 33
(58) Field of Classification Search .................. 220/295, 220/304, 378, DIG. 32, 33
See application file for complete search history.

(56) References Cited

U.S. PATENT DOCUMENTS

| 3,912,117 | A | * | 10/1975 | Ryding | 220/293 |
| 3,937,357 | A | * | 2/1976 | Burgess | 220/203.26 |
| 4,299,102 | A | * | 11/1981 | Aro | 70/165 |
| 4,436,219 | A | * | 3/1984 | Reutter | 220/295 |
| 4,572,396 | A | * | 2/1986 | Kasugai et al. | 220/203.25 |
| 4,588,102 | A | * | 5/1986 | Kasugai | 220/203.25 |

(Continued)

FOREIGN PATENT DOCUMENTS
EP    1 162 099 A    12/2001
(Continued)

OTHER PUBLICATIONS

Machine translation of JP 06-040462A.*
(Continued)

*Primary Examiner* — J. Gregory Pickett
*Assistant Examiner* — Ned A Walker
(74) *Attorney, Agent, or Firm* — Arent Fox LLP

(57) ABSTRACT

A tank cap includes: a synthetic-resin cap body (20) mounted on a fuel supply port cylinder (18) of a conductive fuel tank, (T); a conductive cap shell (22) coupled to an upper part of the cap body (20); and a gasket (23) provided in the cap body (20) and in close contact with a sealing surface (18a) of the fuel supply port cylinder (18). The cap body (20) and the cap shell (22) are linked to be mutually rotatable. A ratchet mechanism (35) is mounted between the cap shell (22) and the cap body (20). An elastic contact piece (38) elastically and slidably contacting an inner peripheral surface of a cylindrical peripheral wall (22a) of the cap shell (22) is integrally projectingly provided on an outer periphery of the gasket (23). Thus, it is possible to cause static electricity carried by an operator to escape to a fuel tank through the gasket.

9 Claims, 9 Drawing Sheets

U.S. PATENT DOCUMENTS

| | | | |
|---|---|---|---|
| 4,854,471 A * | 8/1989 | Kasugai et al. | 220/288 |
| 4,944,425 A * | 7/1990 | Kasugai et al. | 220/203.25 |
| 5,108,001 A * | 4/1992 | Harris | 220/203.06 |
| 5,110,003 A * | 5/1992 | MacWilliams | 220/304 |
| 5,148,934 A * | 9/1992 | Kasugai et al. | 220/203.25 |
| 5,183,173 A * | 2/1993 | Heckman | 220/203.07 |
| 5,279,439 A * | 1/1994 | Kasugai et al. | 220/203.23 |
| 5,395,004 A * | 3/1995 | Griffin et al. | 220/295 |
| 5,509,569 A * | 4/1996 | Hiranuma et al. | 220/746 |
| 5,732,841 A * | 3/1998 | Jocic et al. | 220/203.24 |
| 5,791,507 A * | 8/1998 | Harris et al. | 220/203.26 |
| 5,904,057 A * | 5/1999 | Abney et al. | 70/167 |
| 5,924,590 A * | 7/1999 | Jocic et al. | 220/203.24 |
| 5,975,328 A * | 11/1999 | Hagano et al. | 220/288 |
| 5,992,669 A * | 11/1999 | Hagano et al. | 220/288 |
| 5,992,670 A * | 11/1999 | Hagano et al. | 220/288 |
| 5,992,672 A * | 11/1999 | Hagano et al. | 220/304 |
| 5,996,829 A * | 12/1999 | Hagano et al. | 220/203.23 |
| 5,996,830 A * | 12/1999 | Hagano et al. | 220/203.28 |
| 6,056,139 A * | 5/2000 | Gericke | 220/203.06 |
| 6,095,363 A * | 8/2000 | Harris et al. | 220/203.26 |
| RE36,959 E * | 11/2000 | Griffin | 220/210 |
| 6,197,858 B1* | 3/2001 | Hagano et al. | 524/225 |
| 6,206,219 B1* | 3/2001 | Bruggenolte | 220/230 |
| 6,308,852 B1* | 10/2001 | Hagano et al. | 220/293 |
| 6,568,553 B2* | 5/2003 | Hagano et al. | 220/304 |
| 6,698,611 B2* | 3/2004 | Matsubara et al. | 220/374 |
| 6,793,091 B2* | 9/2004 | Hagano et al. | 220/304 |
| 6,814,251 B2* | 11/2004 | Hagano | 220/288 |
| 6,913,162 B2* | 7/2005 | Hagano et al. | 220/304 |
| 7,278,547 B2* | 10/2007 | Hagano et al. | 220/304 |
| 7,281,639 B2* | 10/2007 | Yoshida et al. | 220/304 |
| 7,320,314 B2* | 1/2008 | Kashima et al. | 123/519 |
| 7,353,808 B2* | 4/2008 | Kakoo | 123/516 |
| 7,543,715 B2* | 6/2009 | Hokazono et al. | 220/303 |
| 7,575,124 B2* | 8/2009 | Nakai et al. | 220/304 |
| 2002/0017524 A1* | 2/2002 | Hagano et al. | 220/304 |
| 2003/0094456 A1* | 5/2003 | Matsubara et al. | 220/367.1 |
| 2003/0102314 A1* | 6/2003 | Hagano et al. | 220/304 |
| 2004/0000553 A1* | 1/2004 | Ueki | 220/293 |
| 2004/0094554 A1* | 5/2004 | Grybush et al. | 220/366.1 |
| 2005/0121004 A1* | 6/2005 | Yamada et al. | 123/519 |
| 2005/0263525 A1* | 12/2005 | Yoshida et al. | 220/304 |
| 2006/0006179 A1* | 1/2006 | Nakai et al. | 220/304 |
| 2006/0037959 A1* | 2/2006 | Hokazono et al. | 220/303 |
| 2006/0185741 A1* | 8/2006 | McKee | 137/587 |
| 2006/0185742 A1* | 8/2006 | Kakoo | 137/587 |
| 2006/0266338 A1* | 11/2006 | Kashima et al. | 123/519 |
| 2009/0026207 A1* | 1/2009 | Matsubara et al. | 220/378 |
| 2009/0276991 A1* | 11/2009 | Sakamoto et al. | 29/422 |

FOREIGN PATENT DOCUMENTS

| | | | |
|---|---|---|---|
| EP | 1162099 A2 * | 12/2001 | |
| EP | 1 512 572 A | 3/2005 | |
| JP | 54-74026 A | 6/1979 | |
| JP | 6-40462 | 2/1994 | |
| JP | 7-34985 | 2/1995 | |
| JP | 11301290 A | 11/1999 | |
| JP | 2000-264079 A | 9/2000 | |
| JP | 2003-137330 | 5/2003 | |
| JP | 2004-190518 | 7/2004 | |
| JP | 2004190518 A * | 7/2004 | |
| JP | 2006044524 A * | 2/2006 | |
| TW | 331792 | 5/1998 | |
| TW | 387383 Y | 4/2000 | |
| TW | 252190 B | 4/2006 | |

OTHER PUBLICATIONS

11920439—JP2004-190518 Translation.doc (Machine Translation of Foreign Patent).*

* cited by examiner

STATIC ELECTRICITY DISCHARGE TANK CAP

CROSS-REFERENCE TO RELATED APPLICATION

This application is a National Stage entry of International Application No. PCT/JP2006/312610, filed Jun. 23, 2006, the entire specification claims and drawings of which are incorporated herewith by reference.

TECHNICAL FIELD

The present invention relates to a tank cap comprising: a synthetic-resin cap body mounted on a fuel supply port cylinder of a conductive fuel tank; a conductive cap shell coupled to an upper part of the cap body and grabbed by an operator; and a gasket provided in the cap body and in close contact with a sealing surface formed at an upper end of the fuel supply port cylinder. Particularly, the present invention relates to an improvement of the tank cap which causes the static electricity carried by the operator grabbing the cap shell to escape to the fuel tank.

BACKGROUND ART

Such a tank cap is already known as disclosed in Patent Publication 1.
Patent Publication 1: Japanese Patent Application Laid-Open No. 7-34985.

DISCLOSURE OF THE INVENTION

Problems to be Solved by the Invention

The conventional tank cap disclosed in the above-described Patent Publication 1 has a predetermined discharge gap provided between a conductive cap shell and a fuel tank in a state in which the tank cap is mounted on a fuel supply port cylinder, thereby causing electricity carried by the operator to escape to the fuel tank. However, because it is not easy to constantly set the discharge gap properly in manufacturing, disadvantageously leading to a poor productivity.

The present invention has been achieved in view of the above-mentioned circumstances, and has an object to provide a tank cap of a simple structure which is easy to manufacture and capable of causing static electricity carried by an operator to escape to a fuel tank.

Means for Solving the Problems

In order to achieve the above object, according to a first feature of the present invention, there is provided a tank cap comprising: a synthetic-resin cap body mounted on a fuel supply port cylinder of a conductive fuel tank; a conductive cap shell coupled to an upper part of the cap body and grabbed by an operator; and a gasket provided in the cap body and in close contact with a sealing surface formed at an upper end of the fuel supply port cylinder, characterized in that the gasket is conductive and is in elastic contact with the cap shell.

According to a second feature of the present invention, in addition to the first feature, a threaded portion threadably fitted into the fuel supply port cylinder is formed on the cap body, and the cap body and the cap shell are linked to be mutually rotatable; a ratchet mechanism is mounted between the cap shell and the cap body, the mechanism idling when a rotation torque in a direction to tighten the cap shell with respect to the threaded portion exceeds a predetermined value; and an elastic contact piece elastically slidably contacting an inner peripheral surface of a cylindrical peripheral wall of the cap shell is integrally projectingly provided on an outer periphery of the gasket.

According to a third feature of the present invention, in addition to the second feature, a plurality of slip-preventing bulging portions bulging outward and arranged with equal pitches are formed on the cylindrical peripheral wall of the cap shell; and the elastic contact piece of the gasket is arranged in a plural number with pitches different from the pitches of the bulging portions so that at least one of the elastic contact pieces is constantly in contact with the inner peripheral surface of the cylindrical peripheral wall of the cap shell except portions corresponding to the bulging portions.

According to a fourth feature of the present invention, in addition to the second or third feature, the gasket comprises an annular lower lip in close contact with the sealing surface, an annular upper lip arranged above the lower lip, and a connection which integrally connects inner peripheral end portions of the two lips and which is attached to an annular mounting groove formed on an outer peripheral surface of the cap body; and the elastic contact pieces project from a periphery of one of the lips.

According to a fifth feature of the present invention, in addition to any of the first to fourth features, the cap shell is made of metal.

According to a sixth feature of the present invention, there is provided a tank cap comprising: a cap body including a threaded portion threadably fitted into a fuel supply port cylinder of a fuel tank; a cap knob rotatably linked to the cap body and grabbed by an operator; a ratchet mechanism arranged to provide linkage between the cap knob and the cap body in a rotational direction, and idling the cap knob when a rotation torque in a direction to tighten the cap knob with respect to the cap body exceeds a predetermined value; and a gasket provided in the cap body and in close contact with a sealing surface formed at an upper end of the fuel supply port cylinder, characterized in that the cap knob is linked to the cap body so that the cap knob can move in an axial direction between a pressurizing position and a pressurizing release position with respect to the cap body; and urging means and engaging means are provided between the cap knob and the cap body, the urging means urging the cap knob in a direction of the pressurizing release position, and the engaging means being engaged to directly link together the cap knob and the cap body in the rotational direction when the cap knob is moved to the pressurizing position against an urging force of the urging means.

According to a seventh feature of the present invention, in addition to the sixth feature, the cap body and the cap knob are respectively provided with a base portion including an annular connecting groove on its peripheral surface and a connecting claw rotatably and axially movably engaged with the connecting groove, in order to provide connection between the cap body and the cap knob so that they can be rotated relative to each other and the cap knob can move between the pressurizing position and the pressurizing release position with respect the cap body; and a flange opposed to an axial end surface of the connecting claw is formed on the cap body, and a concavity and a projection are formed on opposed surfaces of the connecting claw and the flange, the concavity and the projection constituting the engaging means while engaging with and disengaging from each other according to movement of the cap knob between the pressurizing position and the pressurizing release position.

According to an eighth feature of the present invention, in addition to the seventh feature, each of the concavity and the projection is provided in a plural number; the concavities and the projections are arranged to face each other so that some of them are constantly engageable while others are non-engageable; and the urging means is established by giving the flange an elasticity for urging the cap knob toward the pressurizing release position via the projections which are not engaged with the concavities.

According to a ninth feature of the present invention, in addition to the seventh or eighth feature, a top surface of an annular gasket mounting groove formed in the cap body so as to mount therein the gasket comprises a lower surface of the flange.

With the ninth feature of the present invention, it is possible to effectively use the concavity of the engaging means or the flange having projections to form the annular gasket mounting groove, thereby contributing to simplification of the structure of the tank cap.

Effects of the Invention

With the first feature of the present invention, it is possible to cause the static electricity of the operator grabbing the cap shell to escape to the fuel tank via the gasket in a very simple structure where the gasket is made conductive and put in elastic contact with the cap shell. Further, because the elastic contact portion of the gasket contacting the cap shell does not require a high dimensional accuracy, thereby facilitating the production of the gasket to contribute to improvement in productivity of the tank cap.

With the second feature of the present invention, during the screwing and tightening of the cap body onto the fuel supply port cylinder, the idling of the ratchet mechanism prevents breakage of the threaded portion and the gasket due to an excessive tightening. Also during the idling of the ratchet mechanism, the elastic contact piece of the gasket slides on the inner peripheral surface of the cap shell, thereby preventing excessive deformation of the gasket while maintaining the state of contact between the cap shell and the elastic contact piece of the gasket.

With the third feature of the present invention, although the plural slip-preventing bulging portions projecting outward and arranged with equal pitches are present on the cylindrical peripheral wall of the cap shell, it is possible to always reliably maintain the state of contact between the elastic contact pieces of the gasket and the cap shell, irrespective of the bulging portions and the relative rotational positions of the cap shell and the cap body.

With the fourth feature of the present invention, the elastic contact pieces having a high flexibility can be easily formed by using the lips of the gasket, thus obtaining the gasket including the elastic contact pieces at low cost.

With the fifth feature of the present invention, it is possible to manufacture the conductive cap shell at low cost, thereby contributing to cost reduction of the tank cap.

With the sixth feature of the present invention, in the case where the cap knob is strongly pushed into the fuel supply port cylinder when mounting the tank cap on the fuel supply port cylinder, the engaging means is engaged to put the cap knob and the cap body in a directly linked state. Therefore, it is possible to transmit a rotation torque in a direction to tighten the cap knob directly to the cap body without passing through the ratchet mechanism, thereby threadably mounting the cap body reliably on the fuel supply port cylinder.

With the seventh feature of the present invention, it is possible to easily establish the engaging means by using a linkage structure allowing relative rotation between the cap body and the cap knob, thereby contributing to simplification of the structure of the tank cap.

With the eighth feature of the present invention, it is possible to establish the urging means simply by providing the elasticity to the concavity of the engaging means or the flange having projections, thereby contributing to simplification of the structure of the tank cap.

With the ninth feature of the present invention, it is possible to effectively use the concavity of the engaging means or the flange having projections to form the annular gasket mounting groove, thereby contributing to simplification of the structure of the tank cap.

The above-mentioned object, other objects, characteristics, and advantages of the present invention will become apparent from a preferred embodiment, which will be described in detail below by reference to the attached drawings.

EXPLANATION OF THE REFERENCE NUMERALS AND CHARACTERS

Figure 1:
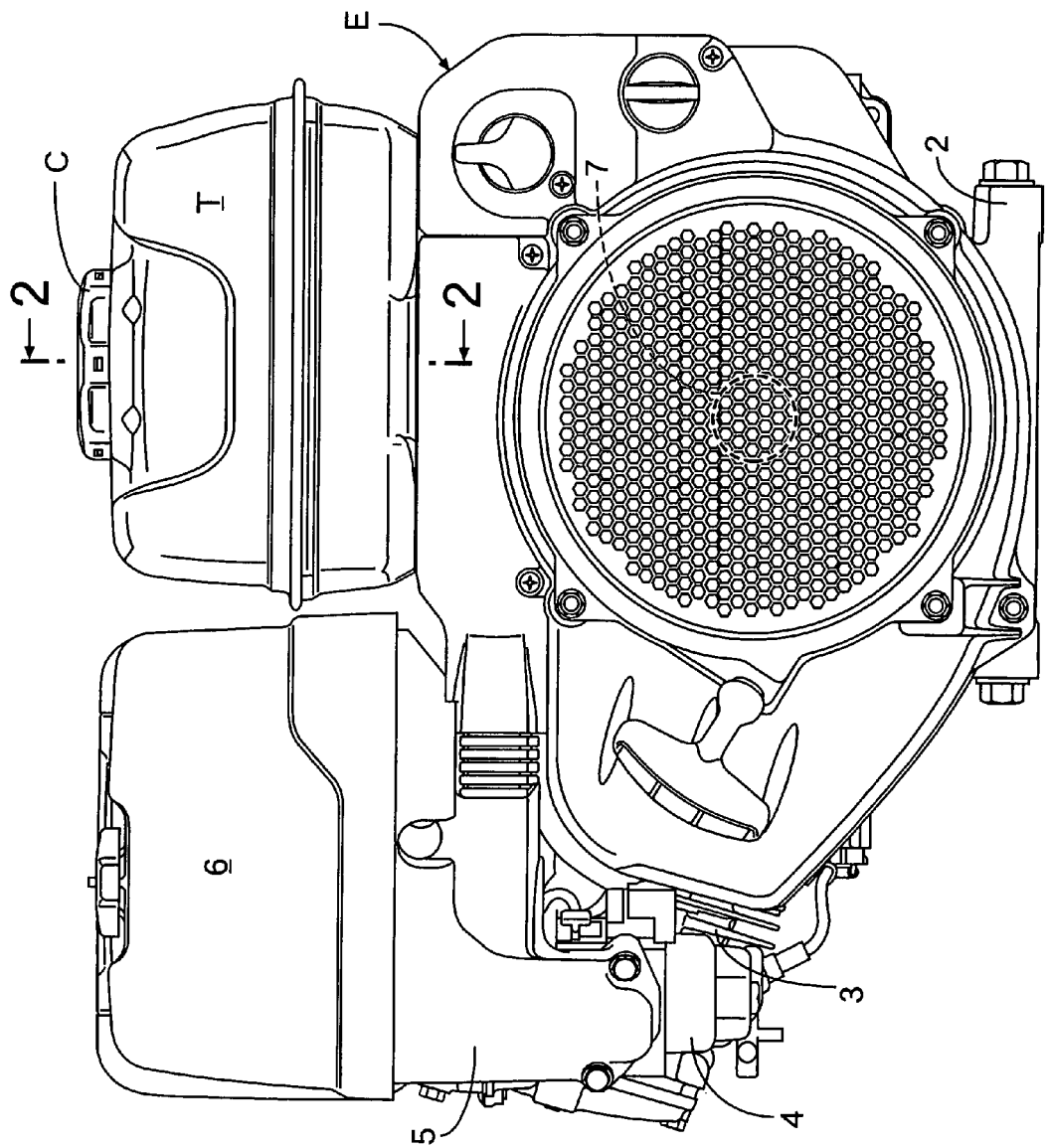
FIG. 1 is a front view of a general-purpose engine according to an embodiment of the present invention. (first embodiment)

A tightening direction
N pressurizing release position
P pressurizing position
T fuel tank
18 fuel supply port cylinder
18a sealing surface
19 cap knob
20 cap body
20c flange
22 cap shell
22a cylindrical peripheral wall
23 gasket
23a lower lip
23b upper lip
23c connection
24 threaded portion
25 gasket mounting groove
28 connecting claws
30 bulging portion
35 ratchet mechanism
38 elastic contact piece
40 projection
40, 41 engaging means
41 concavity

BEST MODE FOR CARRYING OUT THE INVENTION

A preferred embodiment of the present invention is explained below with reference to the accompanying drawings.

Embodiment 1

In FIG. 1, the reference numeral E denotes a general-purpose four-cycle engine serving as a power source for various work machines. The engine E comprises a crank case 2 supporting a crankshaft 1 which is horizontally disposed, and a cylinder portion 3 which protrudes obliquely upward from the crank case 2. A fuel tank T is disposed immediately above the crankcase 2 and supported thereby. A carburetor 4 is attached on one side of the cylinder portion 3. An air cleaner 6 is connected to the carburetor 4 via an intake duct 5, and is disposed immediately above the cylinder portion 3 so as to be positioned beside the fuel tank T.

Figure 2:
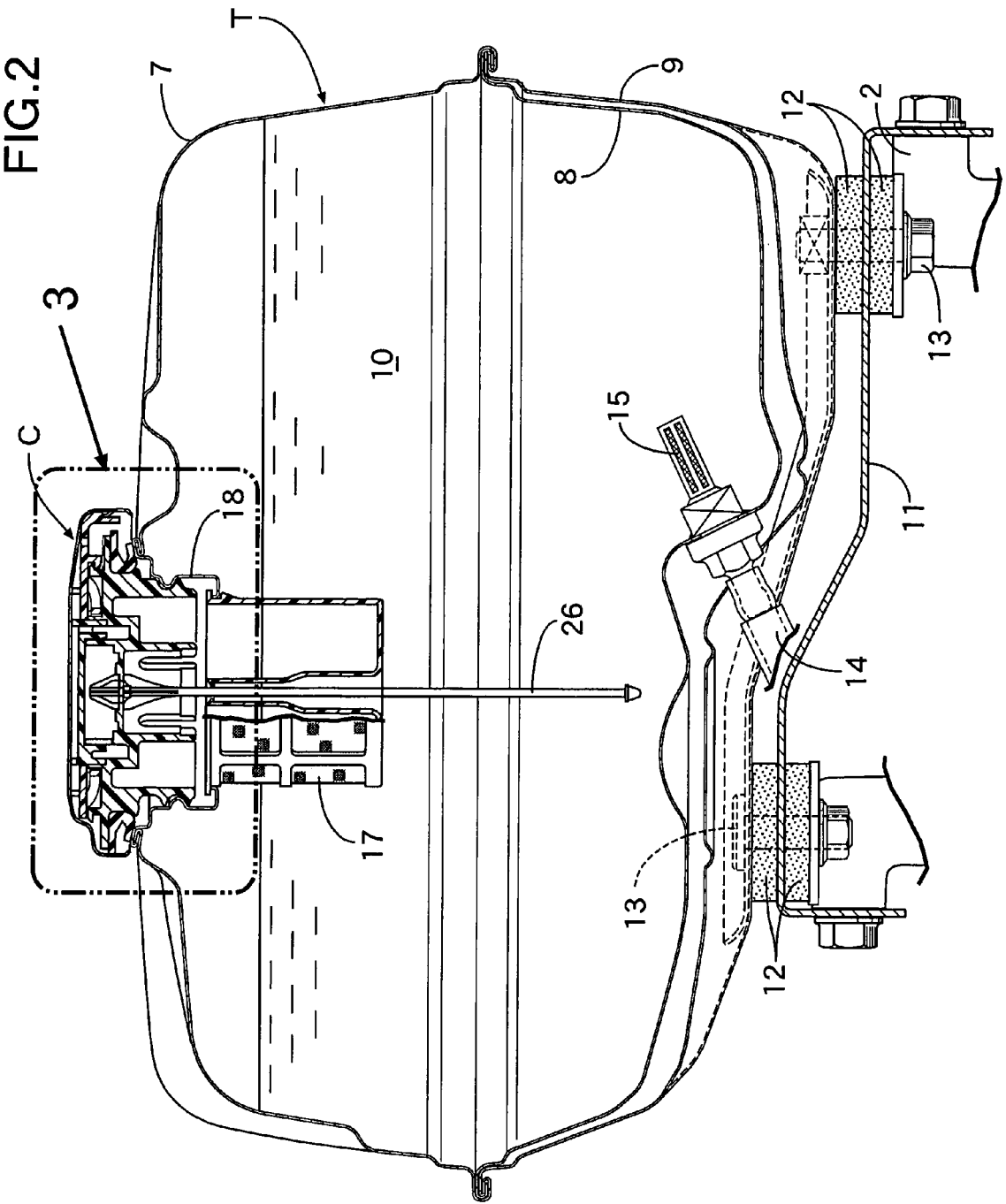
FIG. 2 is a longitudinal section of a fuel tank mounted on the engine. (first embodiment)
Figure 5:
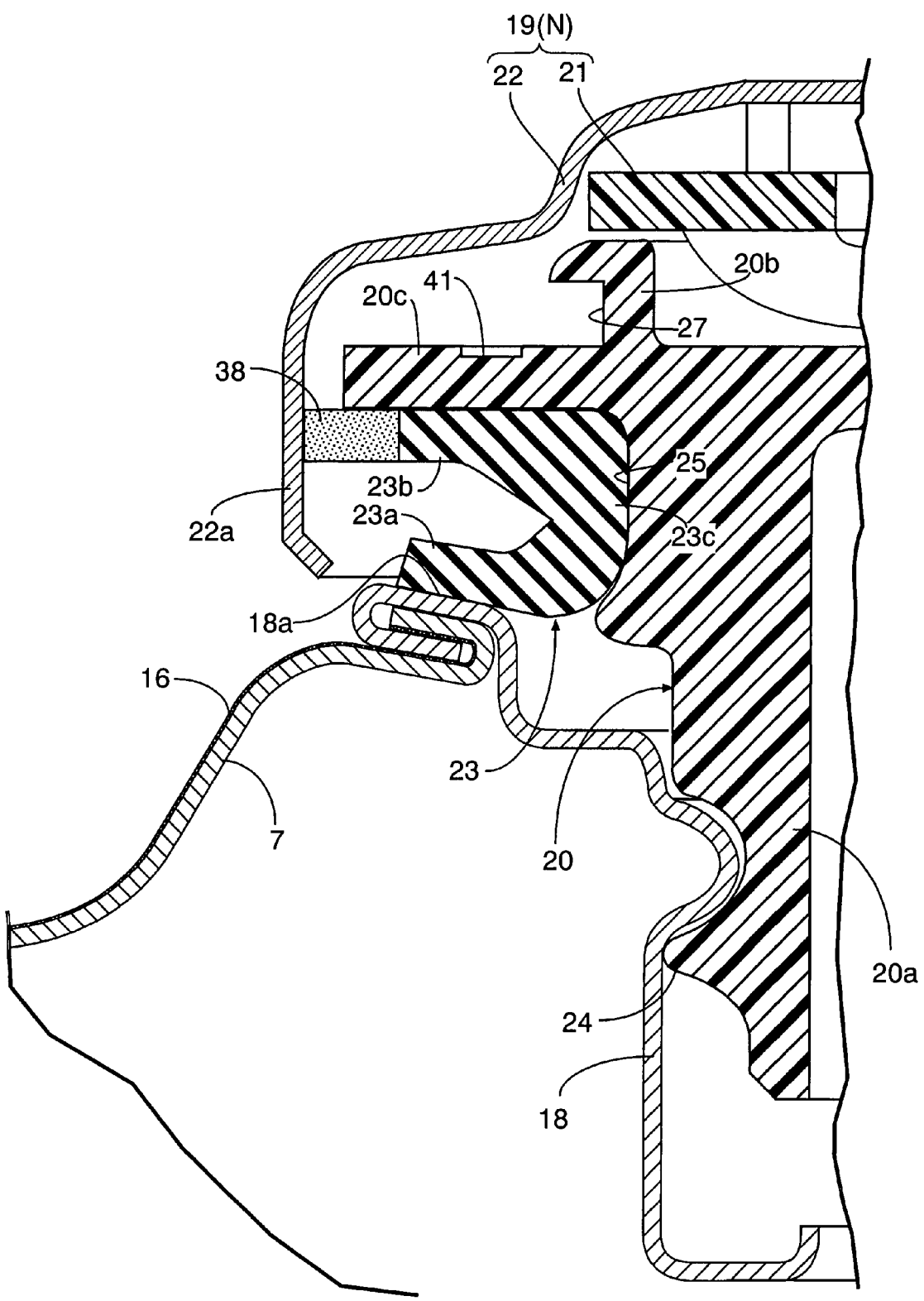
FIG. 5 is an enlarged view of a part 5 of FIG. 3. (first embodiment)

In FIG. 2, the fuel tank T comprises three members, i.e., an upper-half tank body 7 and a lower-half tank body 8 which are in the shape of a bowel and opposed to each other so as to define a fuel storage chamber 10, and a bowel-shaped bottom supporting plate 9 covering a bottom surface of the lower-half tank body 8 with a gap to the bottom surface. These three members are connected all together by crimping their outer peripheral portions. The bottom plate 9 is mounted on a bracket 11 fixed via mounting rubbers 12, 12 to the upper portion of the crankcase 2 with bolts 13, 13, so that the fuel tank T is elastically supported by the engine E. All the upper-half tank body 7, the lower-half tank body 8 and the bottom plate 9 are made of a steel plate. In particular, the upper-half tank body 7 is made of a painted steel plate which is made by prebaking a paint film 16 (see FIG. 5) on a surface of a steel plate.

A fuel conduit 14 is connected to a bottom wall of the lower-half tank body 8, and opens into the fuel storage chamber 10 via a strainer 15. Fuel in the fuel storage chamber 10 is filtered by the strainer 15 and supplied through the fuel conduit 14 to the carburetor 4 by gravitation. In that case, a labyrinth-shaped air vent for allowing breathing by the fuel storage chamber 10 is provided to a tank cap C which will be described later.

Figure 3:
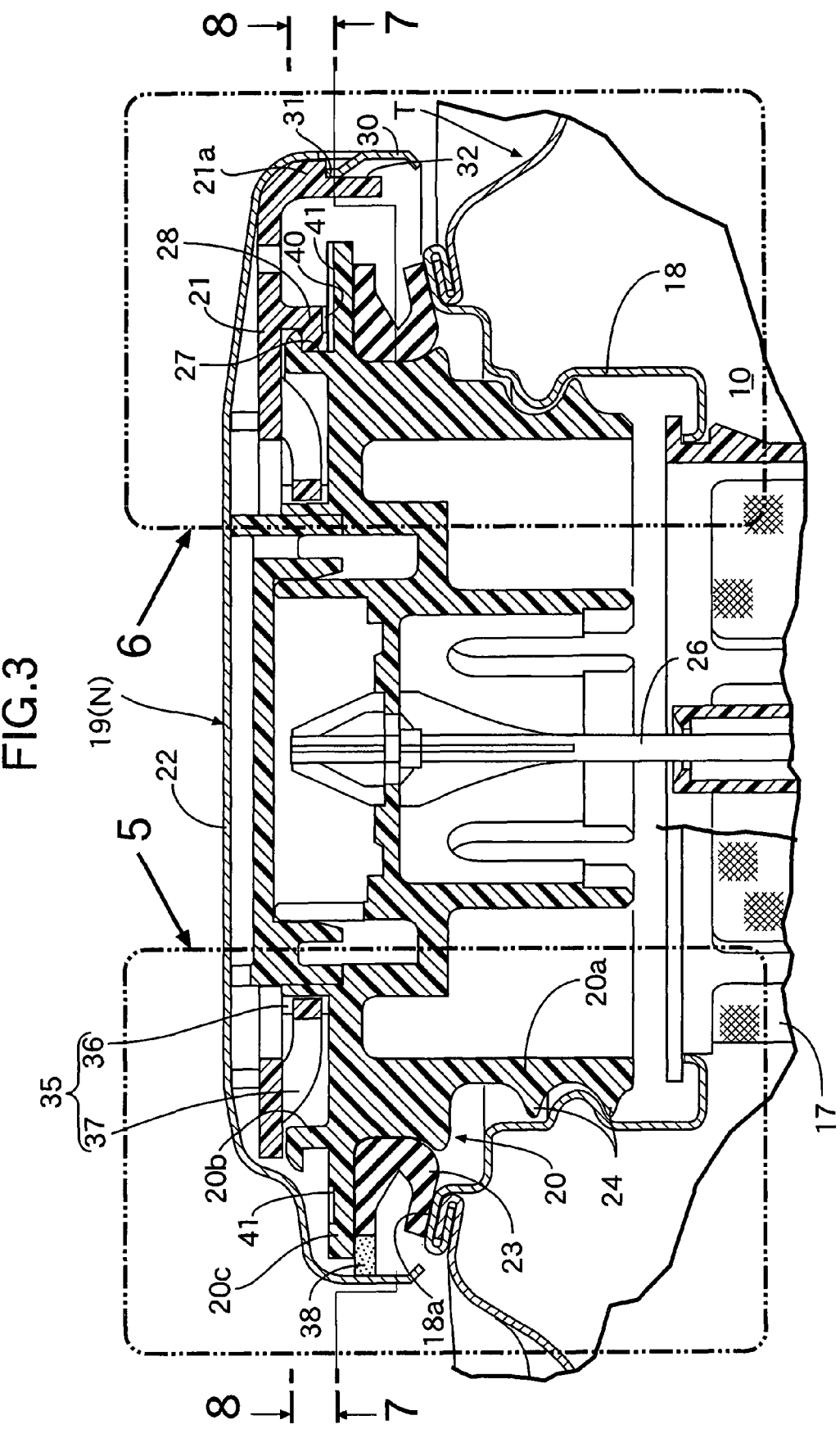
FIG. 3 is an enlarged view of a part 3 of FIG. 2 (sectional view on line 3-3 in FIG. 8). (first embodiment)

As shown in FIG. 3, the upper end of a fuel supply port cylinder 18 made of a plated steel plate is connected by crimping to the central part of the upper-half tank body 7 such that the upper end is exposed, and a funnel-shaped sealing surface 18a is formed in the exposed upper end of the fuel supply port cylinder 18. A fuel filter 17 for filtering the fuel poured into the fuel storage chamber 10 is connected to a lower end of the fuel supply port cylinder 18. The tank cap C is attached to the fuel supply port cylinder 18.

In FIG. 4 and FIGS. 5 to 9, the tank cap C comprises main components as follows: a cap body 40 made of a synthetic resin, a cap knob 19, and a gasket 23. The cap knob 19 comprises: a cap inner part 21 made of a synthetic resin and disposed immediately above the cap body 20; and a cap shell 22a cap shell 22 made of a steel plate and covering a top surface and an outer peripheral surface of the cap inner part 21.

The cap body 20 comprises: a cylindrical portion 20a with a ceiling, including on its periphery a threaded portion 24 capable of being screwed into the inner peripheral surface of the fuel supply port cylinder 18; a cylindrical base portion 20b projecting concentrically from an upper end surface of the cylinder portion 20a; and a flange 20c which overhangs radially from the upper end of the cylindrical portion 20a. An annular gasket mounting groove 25 leading to a lower surface of the flange 20c is formed on an upper peripheral surface of the cylindrical portion 20a. The gasket 23 which comes into close contact with the sealing surface 18a is attached to the mounting groove 25. A teaser 26 (see FIGS. 2 and 3) for preventing the tank cap C removed from the fuel supply port cylinder 18 from dropping off is connected to the center of the ceiling portion of the cap shell 22.

Figure 6:
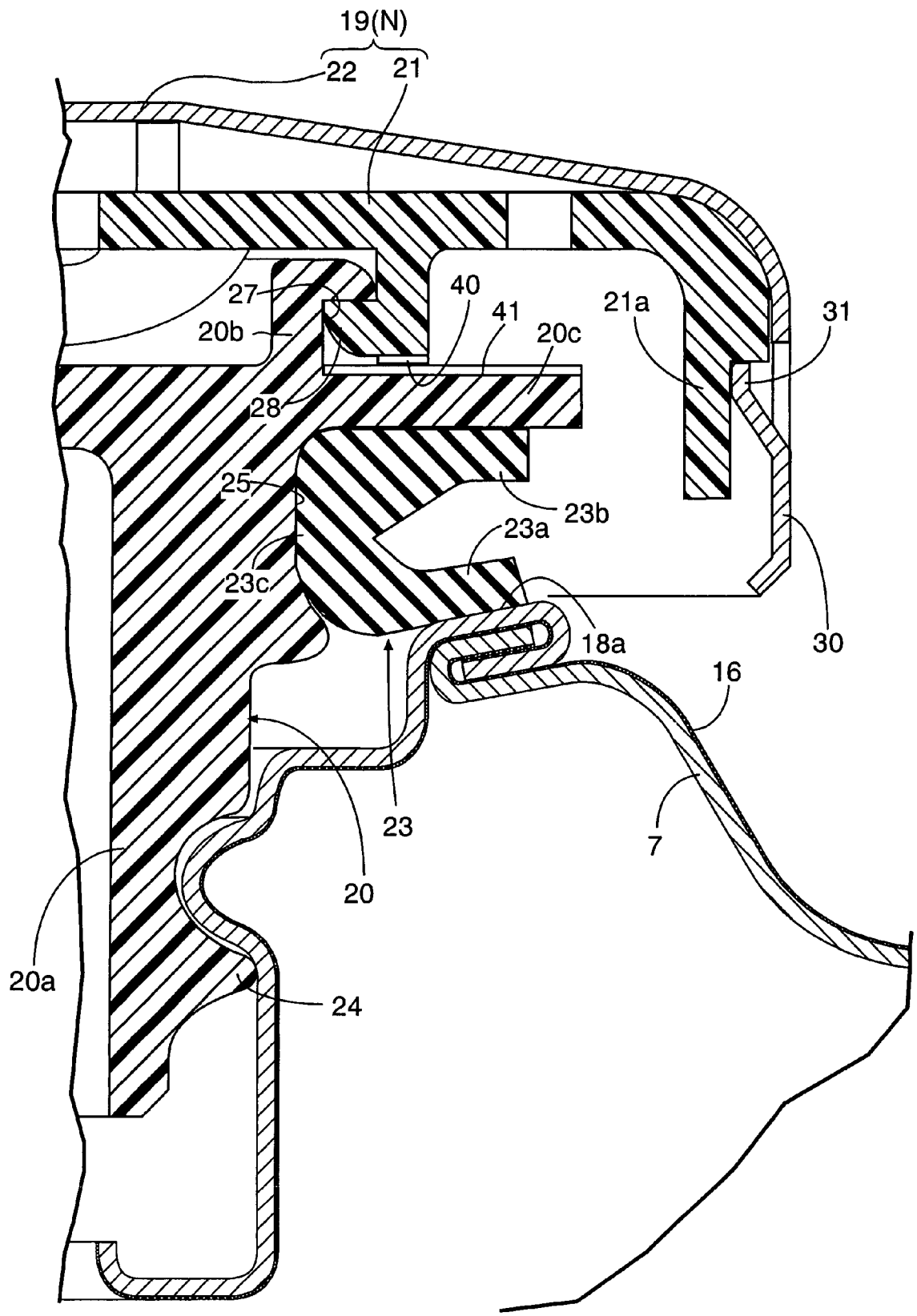
FIG. 6 is an enlarged view of a part 6 of FIG. 3. (first embodiment)
Figure 7:
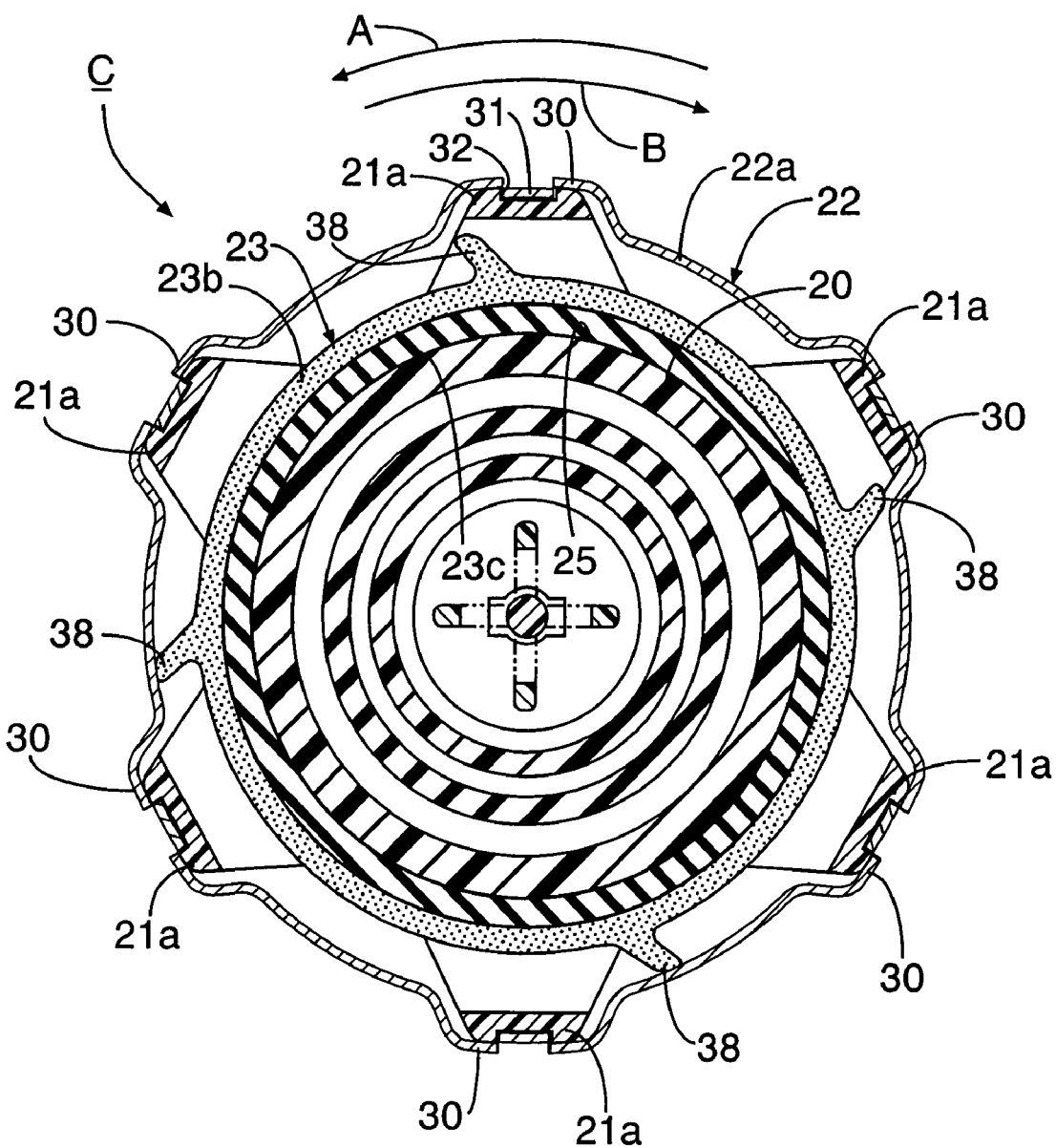
FIG. 7 is a sectional view on line 7-7 in FIG. 3. (first embodiment)
Figure 8:
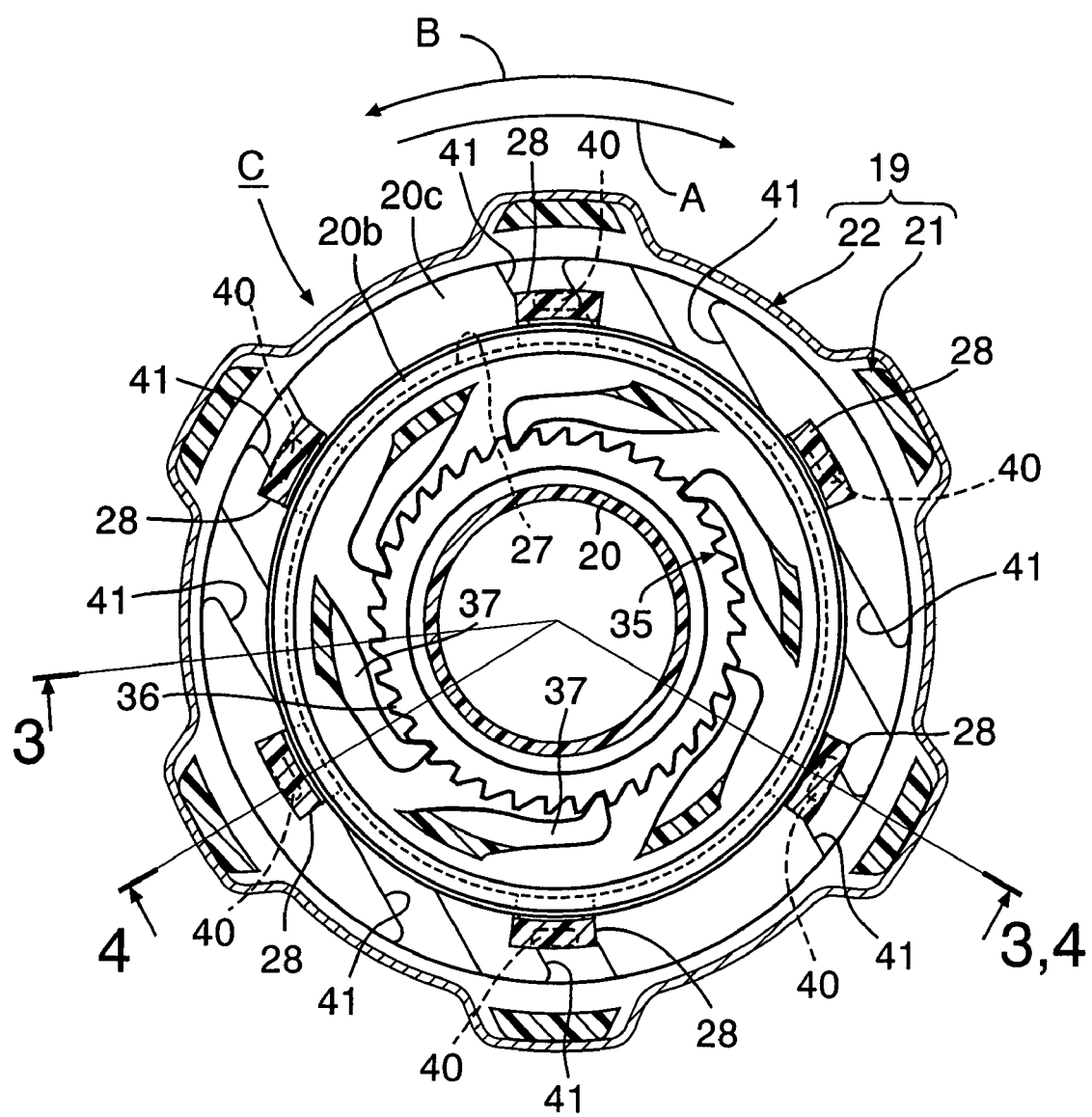
FIG. 8 is a sectional view on line 8-8 in FIG. 3. (first embodiment)

As shown in FIGS. 6 to 8, the cap inner part 21 includes multiple projections 21a which project from the periphery of the cap inner part 21 into a shape of a star, and which have leading end parts bent downward. The cylindrical cap shell 22 with a ceiling is fitted onto the periphery of the cap inner part 21. Multiple bulging portions 30 which receive the multiple projections 21a of the cap inner part 21 inside are integrally formed on the peripheral surface of the cap shell 22. Engaging claws 31 are cut out to rise from the bulging portions 30 and engaged with concavities 41 on the outer surface of the projections 21a, whereby the cap shell 22 is fixedly mounted to the cap inner part 21. The bulging portions 30 serve as slip stoppers when rotating the cap shell 22.

An annular connecting groove 27 is provided on the outer peripheral surface of the base portion 20b of the cap body 20. The connecting groove 27 is engaged by multiple L-shaped connecting claws 28 which are projectingly provided on the lower surface of the cap inner part 21, whereby the cap body 20 and the cap knob 19 are linked together so that they can rotate relative to each other.

When the rotational direction of the cap knob 19 in screwing the cap body 20 into the fuel supply port cylinder 18 (hereinafter referred to as "the tightening direction"), and the rotational direction reverse to the rotational direction A is denoted by B (hereinafter referred to as "the loosening direction"), a ratchet mechanism 35 is interposed between the cap inner part 21 and the cap body 20 so as to be capable of transmitting the rotation of the cap inner part 21 in the tightening direction A to the cap body 20 within a predetermined torque range and of transmitting the rotation of the cap inner part 21 in the loosening direction B to the cap body 20 without slip.

That is, as shown in FIGS. 3 and 7, the ratchet mechanism 35 comprises: a ratchet gear 36 formed on the cap body 20 and disposed inside the cylindrical base portion 20b concentrically therewith; and multiple ratchet pawls 37 integrally formed in the cap inner part 21 to be elastically engaged with the ratchet gear 36. When the cap shell 22 and the cap inner part 21 are rotated in the tightening direction A, if the rotation torque exceeds a specified torque sufficient for appropriately bringing the gasket 23 into close contact with the sealing surface 18a of the fuel supply port cylinder 18, the ratchet pawls 37 slip from the ratchet gear 36. When the cap shell 22 and the cap inner part 21 are rotated in the loosening direction B, no slip occurs between the ratchet pawls 37 and the ratchet gear 36, so that the cap inner part 21 and the cap body 20 integrally rotate.

In FIGS. 3 to 7, dimensions of the connecting groove 27 of the cap body 20 and the multiple connecting claws 28 of the cap inner part 21 are set so that the connecting claws 28 can axially move over a certain distance in the connecting groove 27. Thus, the cap knob 19 can move axially on the cap body 20 between a lower pressurizing position P and an upper pressurizing release position N. The ratchet mechanism 35 allows the axial movement of the cap knob 19 by providing axial slip at an engaged portion between the ratchet gear 36 and the ratchet pawls 37, and deflection of the ratchet pawls 37.

The multiple connecting claws 28 respectively have projections 40 integrally formed on lower end surfaces thereof. Multiple groove-shaped concavities 41 engageable with the projections 40 of the connecting claws 28 are formed on the top surface of the flange 20c of the cap body 20.

Figure 9:
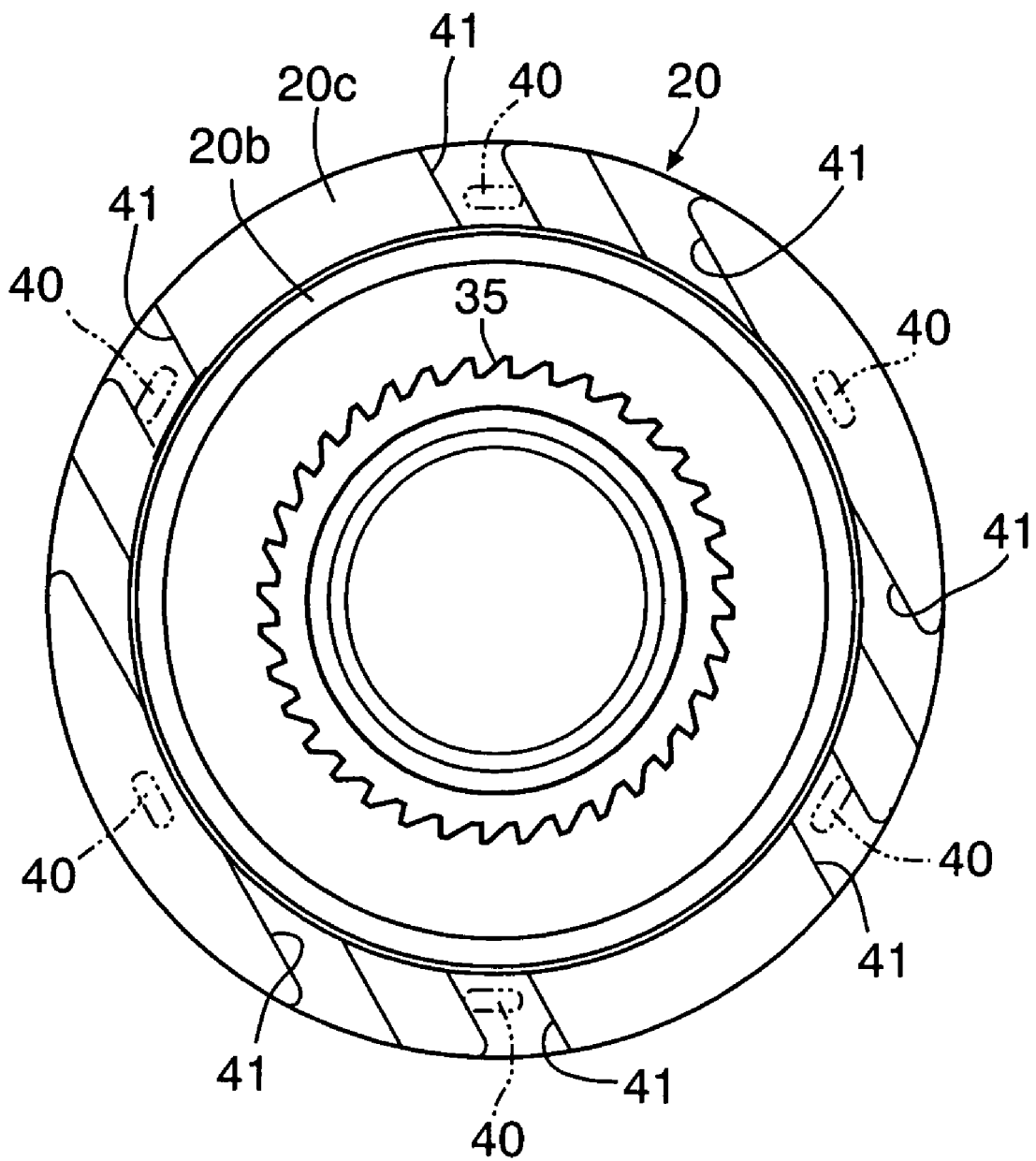
FIG. 9 is a plan view of a single unit of a cap body of a tank cap. (first embodiment)

As shown in FIGS. 8 and 9, the multiple projections 40 and concavities 41 are arranged to face each other so that some of the projections 40 and the concavities 41 can be constantly engaged with each other while others cannot be engaged in any relative rotational position of the cap knob 19 and the cap body 20. That is, the projections 40 and the concavities 41 differ from each other in the pitch and the number. The flange 20c is provided with an elasticity for urging the cap knob 19 toward the pressurizing release position N via the projections 40 which are not engaged with the concavities 41.

Referring again to FIGS. 5 and 7, the gasket 23 comprises: an annular lower lip 23a which comes into close contact with the sealing surface 18a of the fuel supply port cylinder 18; an annular upper lip 23b which comes into close contact with the lower surface of the flange 20c of the cap body 20 above the lower lip 23a; and a connection 23c which integrally connects inner peripheral end portions of the two lips 23a, 23b and is attached to the gasket mounting groove 25 of the cap body 20. In this case, multiple elastic contact pieces 38 are integrally formed at the periphery of either of the two lips 23a, 23b, of the upper lip 23b in the present embodiment. The multiple elastic contact pieces 38 elastically come into contact with the inner peripheral surface of a peripheral wall 22a of the cap shell 22 except the bulging portions 30. Each of the elastic contact pieces 38 is inclined in a certain direction so as to slip smoothly on the inner peripheral surface of the cap shell 22 when a relative rotation occurs between the cap shell 22 and the cap body 20 due to the slip action of the ratchet mechanism 35. The multiple elastic contact pieces 38 and the bulging portions 30 are arranged at equal pitches around the axis of the tank cap C, but the numbers of the arranged elastic contact pieces 38 and the bulging portions 30 differ so as to arrange them at different pitches. As a result, in any relative rotational position of the cap shell 22 and the cap body 20, any of the multiple elastic contact pieces 38 is constantly in contact with the inner peripheral surface of the cap shell 22 except the multiple bulging portions 30. The state of the elastic contact pieces 38 contacting the inner peripheral surface of the cap shell 22 is maintained by the deflection or slip of the elastic contact pieces 38, even when the cap knob 19 axially moves with respect to the cap body 20 as described above.

The gasket 23 is molded from a conductive elastic material, for example, a material obtained by kneadingly incorporating vinyl chloride and carbon into natural rubber, and its specific volume electric resistivity is set at $10^4$ to $10^{10}\Omega$.

Next, the operation of this embodiment will be described.

In a state in which the tank cap C is attached to the fuel supply port cylinder 18, the conductive cap body 20 is screwed into the fuel supply port cylinder 18 of the fuel tank T made of metal, the conductive gasket 23 attached to the cap body 20 is in close contact with the sealing surface 18a of the fuel supply port cylinder 18, and the elastic contact pieces 38 of the gasket 23 is in contact with the cap shell 22 made of metal. Therefore, the cap shell 22 is electrically grounded to the fuel tank T via the gasket 23. Thus, if an operator carrying static electricity grabs the cap shell 22 in order to refill the fuel tank T with fuel, the static electricity escapes to the fuel tank T through the gasket 23.

As described above, with a very simple construction in which the cap shell 22 is made of metal and the gasket 23 including the elastic contact pieces 38 in contact with the cap shell 22 is formed from a conductive material, it is possible to cause the static electricity carried by the operator to escape to the fuel tank. Further, because the elastic contact pieces 38 of the gasket 23 do not require a high dimensional accuracy, the production of the gasket 23 is easy. In addition, it is easy to form the threaded portion 24 in the cap body 20 made of synthetic resin, the production of the cap shell 22 made of metal is easy, and the cap shell 22 has a high impact resistance. Therefore, it is possible to provide a tank cap C having a high productivity and a high durability at low cost.

As described above, the cap body 20 and the cap shell 22 are connected so as to be mutually rotatable; at the same time the ratchet mechanism 35, which idles when a rotation torque in the tightening direction A of tightening the cap shell 22 to the threaded portion 24 exceeds a predetermined value, is interposed between the cap shell 22 and the cap body 20; and the elastic contact pieces 38, which elastically come into sliding contact with the inner peripheral surface of the cylindrical peripheral wall 22a of the cap shell 22, are projectingly provided integrally on the periphery of the gasket 23. Therefore, during the screwing and tightening of the cap body 20 onto the fuel supply port cylinder 18, the idling of the ratchet mechanism 35 prevents the breakage of the threaded portion 24 and the gasket 23 due to an excessive tightening. Also during the idling of the ratchet mechanism 35, the elastic contact pieces 38 slide on the inner peripheral surface of the cap shell 22, thereby preventing an excessive deformation of the gasket 23 while maintaining the state of contact between the cap shell 22 and the elastic contact pieces 38 of the gasket 23.

Further, the multiple bulging portions 30, serving as slip stoppers which bulge outward and are arranged at equal pitches, are formed on the cylindrical peripheral wall 22a of the cap shell 22, and the elastic contact pieces 38 of the gasket 23 are arranged in a plural number at pitches different from the pitches of the bulging portions 30, whereby at least one of the elastic contact pieces 38 is constantly in contact with the inner peripheral surface of the cylindrical peripheral wall 22a of the cap shell 22 except portions corresponding to the bulging portions 30. Therefore, although the multiple bulging portions 30, serving as slip stoppers which bulge outward and are arranged at equal pitches, are present on the cylindrical peripheral wall 22a of the cap shell 22, it is possible to always reliably maintain the state of contact between the elastic contact pieces 38 of the gasket 23 and the cap shell 22, thereby ensuring the state of grounding of the cap shell 22 to the fuel tank T, irrespective of the bulging portions 30 and the relative rotational positions of the cap shell 22 and the cap body 20.

Furthermore, the gasket 23 comprises the lower lip 23a which comes into close contact with the sealing surface 18a of the fuel supply port cylinder 18, the upper lip 23b which comes into close contact with the lower surface of the flange 20c of the cap body 20 above the lower lip 23a, and the connection 23c which integrally connects inner peripheral ends of the two lips 23a, 23b and is attached to the annular gasket mounting groove 25 of the peripheral surface of the cap body 20; and the elastic contact pieces 38 are caused to project from the periphery of either of the two lips 23a, 23b. Therefore, the elastic contact pieces 38 having a high flexibility can be easily formed by using the upper lip 23b or the lower lip 23a of the gasket 23. Thus, the gasket 23 including the elastic contact pieces 38 can be obtained at low cost.

On the other hand, in the fuel tank T, the upper-half tank body 7 is made from a painted steel plate and the fuel supply port cylinder 18 made from a plated steel plate is connected to the upper-half tank body 7 by crimping so that the upper part of the fuel supply port cylinder 18 is exposed, and the surface of the exposed upper part of the fuel supply port cylinder 18 is formed to be the funnel-shaped sealing surface 18a which is in close contact with the gasket 23. Therefore, it is possible to eliminate troublesome steps after manufacture of the tank T, such as a masking/painting step in which a paint is applied to the outer surface of the fuel tank T while masking the sealing surface 18a, thereby contributing to improvement in the productivity of the fuel tank T.

Further, the sealing surface 18a is formed at the upper end of the fuel supply port cylinder 18 made of a plated steel plate, and thus in the case of an accidental exfoliation of the paint film on the upper-half tank body 7, it is possible to always maintain the sealing surface 18a in a good condition irrespective of the exfoliation of the paint film.

Furthermore, the upper end of the fuel supply port cylinder 18 is connected by crimping so as to be exposed, and the surface of the exposed upper end of the fuel supply port cylinder 18 is formed to be the sealing surface 18a. Therefore, it is possible to enhance the rigidity of the sealing surface 18a to effectively improve the sealability and durability. Further, it is possible to cause the fuel sticking to the sealing surface 18a to flow naturally into the fuel tank T along the funnel-shaped sealing surface 18a, thereby preventing the stain by the fuel on the top surface of the fuel tank.

As described above, the multiple concavities 41 of the flange 20c of the cap body 20 and the multiple projections 40 of the connecting claws 28 of the cap knob 19 are arranged to face each other so that some of the multiple concavities 41 and the projections 40 are constantly engageable while others are non-engageable, in any relative rotational position of the cap knob 19 and the cap body 20. Therefore, the projections 40 non-engageable with the concavities 41 contact the flat top surface of the flange 20c. Further, the flange 20c urges by its elastic restoring force upward the projections 40 contacting its top surface, so that the urging force is transmitted from the projections 40 to the entire cap knob 19. As a result, the connecting claws 28 are pushed up to the pressurizing release position N where the connecting claws 28 contact the top surface of the connecting groove 27 of the base portion 20b of the cap body 20. Thus, also some of the projections 40 and the concavities 41 engageably opposed to each other are maintained in a disengaged state, so that the cap knob 19 becomes capable of rotating in the tightening direction A.

Therefore, in the step of attaching the tank cap C to the fuel supply port cylinder 18, when the cap knob 19 is quietly rotated in the tightening direction A without applying a particularly large depressing force to the cap knob 19 while fitting the threaded portion 24 of the cap body 20 into the fuel supply port cylinder 18, the rotation torque is transmitted to the cap body 20 through the ratchet pawls 37 and the ratchet gear 36 which are engaged with each other, thereby threadably fitting the threaded portion 24 on the fuel supply port cylinder 18, and putting the gasket 23 in close contact with the sealing surface 18a of the fuel supply port cylinder 18. If the gasket 23 appropriately comes into close contact with the sealing surface 18a, and the torque at a specified value or more is applied to the ratchet pawls 37 and the ratchet gear 36 which are engaged with each other, the ratchet gear 36 slips out of the ratchet pawls 37 to generate sound. With this arrangement, the operator can realize that the tank cap C is properly mounted on the fuel supply port cylinder 18, thereby finishing the mounting operation. The above-described idling of the ratchet mechanism 35 prevents the breakage of the threaded portion 24 and the gasket 23 due to an excessive tightening.

In the step of attaching the tank cap C, if the gasket 23 is strongly pushed into the fuel supply port cylinder 18 and down to the pressurizing position P, the gasket 23 comes into close contact with the sealing surface 18a of the fuel supply port cylinder 18 before the threaded portion 24 is threadably fitted on the fuel supply port cylinder 18.

Figure 4:
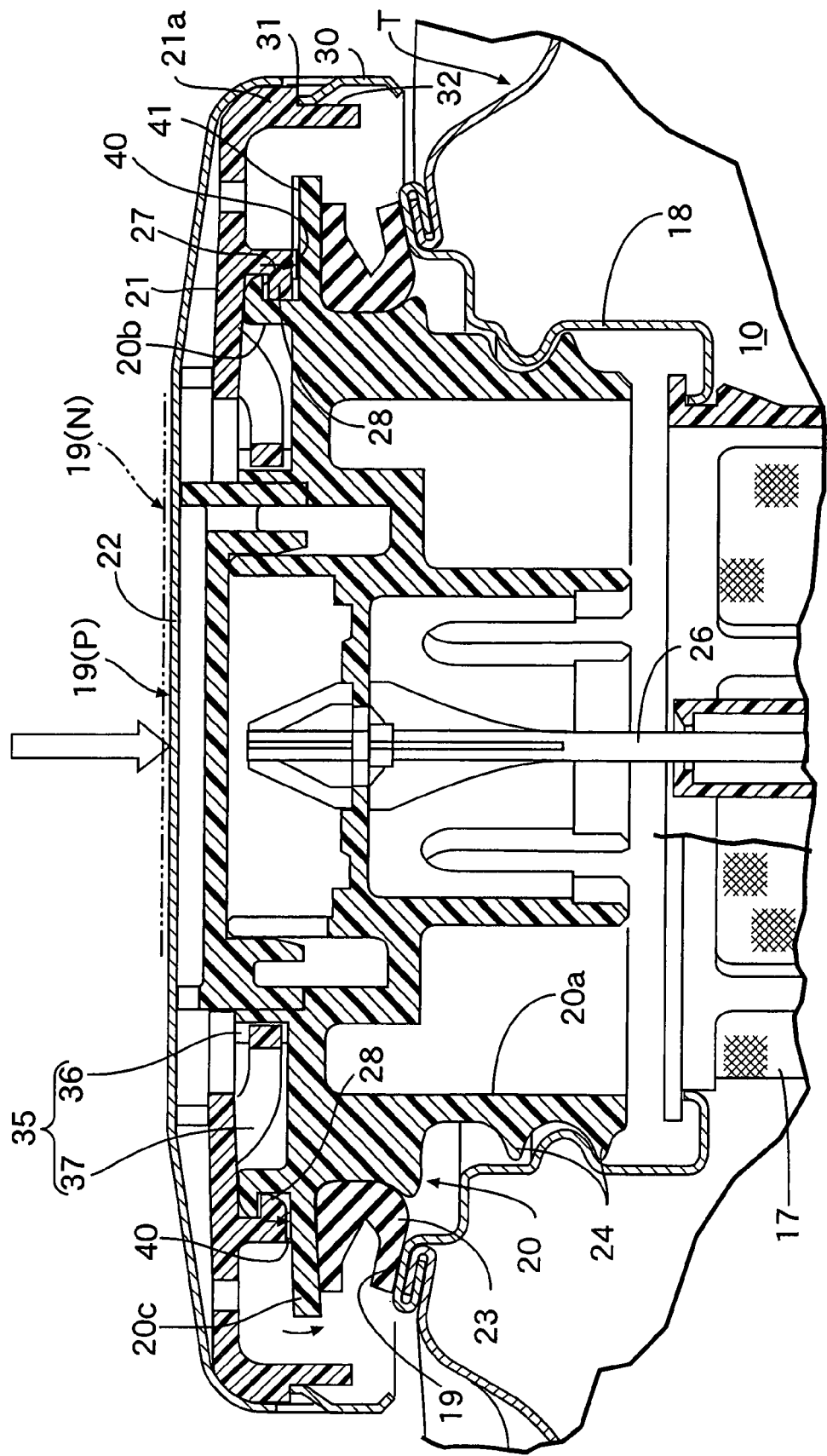
FIG. 4 is a view, corresponding to FIG. 3, for explaining operation. (first embodiment)

However, if the cap knob 19 is pushed down to the pressurizing position P, the projection 40 of the connecting claw 28 opposed to the concavity 41 of the flange 20c is engaged with the concavity 41 as shown in the right half of FIG. 4, but the projection 40 in contact with the top surface of the flange 20c is partially deflected as shown ion the left half of FIG. 4, thereby allowing engagement between some of the projections 40 and the concavities 41. Therefore, the cap knob 19 and the cap body 20 are directly linked in the rotational direction via some of the projections 40 and the concavities 41 engaged with each other. Thus, if the cap knob 19 is turned in the tightening direction A, the rotation torque is transmitted directly to the cap body 20 without passing through the ratchet mechanism 35, thereby threadably mounting the cap body 20 reliably on the fuel supply port cylinder 18.

When the depressing force to the cap knob 19 is released, a repulsive force of the portion of the flange 20c which is deflected downward by the projection 40 not engaged with the concavity 41 of the flange 20c pushes the entire cap knob 19 down to the pressurizing release position N via such a non-engaged projection 40, whereby the tank cap C returns to a free state in which all the projections 40 are disengaged from the concavities 41.

The flange 20c of the cap body 20 is involved in formation of the annular connecting groove 27 engaged with the connecting claw 28; involved in establishment of the engaging means between the cap knob 19 and the cap body 20 by including the concavity 41 engageable with the projection 40 at lower end of the connecting claw 28; involved in establishment of the urging means for urging the cap knob 19 to the pressurizing release position N by being provided with an elasticity; and involved in formation of the gasket mounting groove 25 on the cap body 20. Therefore, the number of parts is reduced and the structure of the tank cap C is simplified, thereby contributing to cost reduction.

The present invention is not limited to the above-described embodiment, and various modifications in design can be made without departing from the scope of the invention. For example, a spring exclusively used as urging means may be provided in the first feature of the invention.

The invention claimed is:

1. A tank cap comprising:
    a synthetic-resin cap body mounted on a fuel supply port cylinder of a conductive fuel tank;
    a conductive cap shell coupled to an upper part of the cap body;
    a gasket provided in the cap body and in close contact with a sealing surface formed at an upper end of the fuel supply port cylinder;
    an elastic contact piece that elastically slidably contacts an inner peripheral surface of a cylindrical peripheral wall of the cap shell; and
    a plurality of slip-preventing bulging portions bulging outward and arranged with equal pitches and formed on the cylindrical wall of the cap shell,
    wherein the gasket is conductive and in elastic contact with the cap shell via the elastic contact piece, and
    wherein the elastic contact piece is arranged in a plural number with pitches different from the pitches of the bulging portions.

2. The tank cap according to claim 1, wherein a threaded portion threadably fitted into the fuel supply port cylinder is formed on the cap body, and the cap body and the cap shell are linked to be mutually rotatable; and a ratchet mechanism is mounted between the cap shell and the cap body, the mechanism idling when a rotation torque in a direction to tighten the cap shell with respect to the threaded portion exceeds a predetermined value, wherein the elastic contact piece is integrally projectingly provided on an outer periphery of the gasket.

3. The tank cap according to claim 2, wherein at least one of the elastic contact pieces is constantly in contact with the inner peripheral surface of the cylindrical peripheral wall of the cap shell except portions corresponding to the bulging portions.

4. The tank cap according to claim 2 or 3, wherein the gasket comprises an annular lower lip in close contact with the sealing surface, an annular upper lip arranged above the lower lip, and a connection which integrally connects inner peripheral end portions of the annular lower and upper lips and which is attached to an annular mounting groove formed on an outer peripheral surface of the cap body; and the elastic contact pieces project from a periphery of one of the annular lower and upper lips.

5. The tank cap according to any one of claims 1 to 3, wherein the cap shell is made of metal.

6. A tank cap comprising:
   a cap body including a threaded portion threadably fitted into a fuel supply port cylinder of a fuel tank;
   a cap knob rotatably linked to the cap body;
   a ratchet mechanism which provides linkage between the cap knob and the cap body in a rotational direction, and idling the cap knob when a rotation torque in a direction to tighten the cap knob with respect to the cap body exceeds a predetermined value; and
   a gasket provided in the cap body and in close contact with a sealing surface formed at an upper end of the fuel supply port cylinder,
   wherein the cap knob is linked to the cap body so that the cap knob can move in an axial direction between a pressurizing position and a pressurizing release position with respect to the cap body; and
   wherein urging means and engaging means are provided between the cap knob and a portion of the cap body, the urging means contacting the gasket and having an upward elastic restoring force for urging the cap knob in a direction of the pressurizing release position, and the engaging means being engaged to directly link together the cap knob and the cap body in the rotational direction when the cap knob is moved to the pressurizing position against an urging force of the urging means.

7. The tank cap according to claim 6,
   wherein the cap body and the cap knob are respectively provided with a base portion including an annular connecting groove on a peripheral surface and a connecting claw rotatably and axially movably engaged with the connecting groove, in order to provide connection between the cap body and the cap knob so that they can be rotated relative to each other and the cap knob can move between the pressurizing position and the pressurizing release position with respect the cap body; and
   a flange opposed to an axial end surface of the connecting claw is formed on the cap body, and a concavity and a projection are formed on opposed surfaces of the connecting claw and the flange, the concavity and the projection constituting the engaging means while engaging with and disengaging from each other according to movement of the cap knob between the pressurizing position and the pressurizing release position.

8. The tank cap according to claim 7, wherein each of the concavity and the projections is provided in a plural number; the concavities and the projections are arranged to face each other so that a first concavity and a first projection are engageable and a second concavity and a second projection are non-engageable, wherein the flange is elastic, thereby urging the cap knob toward the pressurizing release position via the second projection that is not engaged with the second concavity.

9. The tank cap according to claim 7 or 8,
   wherein a top surface of an annular gasket mounting groove formed in the cap body comprises a lower surface of the flange.

* * * * *